(12) United States Patent
Huitema

(10) Patent No.: US 7,336,623 B2
(45) Date of Patent: Feb. 26, 2008

(54) PEER-TO-PEER CLOUD-SPLIT DETECTION AND REPAIR METHODS

(75) Inventor: Christian Huitema, Clyde Hill, WA (US)

(73) Assignee: Microsoft Corporation, Redmond, WA (US)

(*) Notice: Subject to any disclaimer, the term of this patent is extended or adjusted under 35 U.S.C. 154(b) by 937 days.

(21) Appl. No.: 10/696,776

(22) Filed: Oct. 30, 2003

(65) Prior Publication Data

US 2005/0157659 A1 Jul. 21, 2005

(51) Int. Cl.
*H04L 12/28* (2006.01)

(52) U.S. Cl. .................. 370/254; 370/241.1; 370/242; 370/255; 370/256; 370/253; 711/118; 711/119; 711/122; 711/123; 711/129; 711/130

(58) Field of Classification Search ............. None
See application file for complete search history.

(56) References Cited

U.S. PATENT DOCUMENTS

| | | | | |
|---|---|---|---|---|
| 6,912,622 B2* | 6/2005 | Miller | ................... | 711/129 |
| 2002/0143989 A1 | 10/2002 | Huitema et al. | | |
| 2003/0055892 A1 | 3/2003 | Huitema et al. | | |
| 2003/0056093 A1 | 3/2003 | Huitema et al. | | |
| 2003/0196060 A1* | 10/2003 | Miller | ................... | 711/170 |
| 2003/0204742 A1* | 10/2003 | Gupta et al. | ................ | 713/200 |

\* cited by examiner

*Primary Examiner*—Raj K. Jain
(74) *Attorney, Agent, or Firm*—Marshall, Gerstein & Borun LLP

(57) ABSTRACT

A method for detecting and repairing cloud splits in a distributed system such as a peer-to-peer (P2P) system is presented. Nodes in a cloud maintain a multilevel cache of entries for a subset of nodes in the cloud. The multilevel cache is built on a circular number space, where each node in the cloud is assigned a unique identifier (ID). Nodes are recorded in levels of the cache according to the distance from the host node. The size of the cloud is estimated using the cache, and cloud-split tests are performed with a frequency inversely proportional to the size of the cloud. Cloud splits are initially detected by polling a seed server in the cloud for a node N having an ID equal to the host ID+1. The request is redirected to another node in the cloud, and a best match for N is resolved. If the best-match is closer to the host than any node in the host's cache, a cloud split is presumed. The cloud split is repaired by flooding the host's address to the newly found node and sending repair messages to nodes in the host's top cache level. Each node receiving a repair message repeats a similar process, and sends repair messages to nodes in its next lower cache level.

10 Claims, 9 Drawing Sheets

700

| |
|---|
| 710 PNRP ID to Locate |
| 720 Network Address |
| 730 Repair Level |

FIG. 7

PEER-TO-PEER CLOUD-SPLIT DETECTION AND REPAIR METHODS

FIELD OF THE INVENTION

The present invention relates generally to peer-to-peer protocols, and relates more particularly to methods for cloud-split detection and repair via peer-to-peer protocols.

BACKGROUND OF THE INVENTION

Group communication technologies on the Internet allow users with common interest to collaborate, share files, chat with one another, multicast audio and video for presentations and group meetings, and engage in multi-player gaming. Indeed, the ability for group formation in an ad hoc basis presents significant advantages in allowing users with common interests to gather in a virtual area or group that may be segregated from the general Internet population. The segregation facilitates useful discussion in collaboration among such like-minded individuals. Currently, however, most group communication and formation takes place in a server-centric environment wherein all communication flows to or through large central servers.

With the reemergence of peer-to-peer (P2P) technology, the current server-centric model of Internet communication is quickly being replaced. P2P technologies enable users to contact one another in a serverless environment, free from the constraints of server-based Internet communication. As with a server-centric environment, users form ad hoc groups for collaborating, sharing files, chatting, and gaming with one another. These groups, often referred to as clouds in the context of P2P networking, facilitate fast dissemination of common information throughout a distributed network of peers. However, unlike the server-centric environment, the P2P environment avoids bottlenecking and is more resilient to partial network disconnects.

P2P networking relies on the ability of every peer in the cloud to route messages to every other peer in the cloud. In mathematical terms the set of peers in the transitive closure of the cloud must be equal to the set of peers in the cloud itself. If this is not the case, then the cloud is "split." A split divides a cloud into two or more partitions, where each partition is well formed, but communication among the partitions is inconsistent or disabled. Cloud-splits occur for a variety of reasons. The clouds may have started out independently and need to be merged. Or the clouds may have started out as one, but some fragment of the cloud became isolated from the rest of the cloud. Isolation may occur where a subset of peers in the cloud fails or when network failures prevent a subset of peers from communicating with each other.

There exists, therefore, a need in the art for a peer-to-peer cloud split detection and repair method that detects a cloud-split while balancing load on the network as the cloud grows, and quickly and efficiently merges the cloud partitions once detected.

BRIEF SUMMARY OF THE INVENTION

In view of the foregoing, the present invention provides methods for a node belonging to a cloud in a peer-to-peer (P2P) network to detect and repair splits in that cloud. Each node in the cloud is assigned at least one unique peer identifier (ID) and maintains a cache of peer IDs for known nodes. In one embodiment, a node detects a split by sending a resolve message to a well known node in the cloud, such as a node used for bootstrapping via a domain name system (DNS). The resolve message requests address information for an adjacent node. In one embodiment, the peer IDs are unique numbers existing in a circular number space, thus adjacent nodes have peer IDs that differ only by 1.

The resolve message is redirected among nodes until a "best-match" node is found. The best-match node is the node having a peer ID closest to that of the target, among those nodes receiving the message. The repair originator receives address information for that best-match node in a response message. If the repair originator does not have an entry in its cache for the best-match node, the repair originator determines that a split in the cloud exists. The repair originator then informs nodes in its cache that a split exists and sends them repair messages that include the address information of the best-match node.

In one embodiment, each node maintains a multilevel cache, where known nodes are recorded in the cache in accordance with their distance from the node maintaining the cache. Distance between nodes is measured by the distance between their peer IDs in the circular number space. Nodes recorded in the lowest level of the cache are the closest. The lowest level of the cache covers the smallest section of the number space. The next level up covers a larger section of the number space, and so on until the top level covers the entire number space. In this embodiment, the repair originator determines whether the best-match node belongs in the lowest cache level. If so, the repair originator floods the best-match node's address information to each node in the lowest cache level. Those nodes in turn flood their address information to the best-match node. The repair originator also sends its address information to the best-match node. The best-match node then floods the address information of the repair originator to nodes in its cache, who will in turn flood their address information to the repair originator. The repair originator records the address information for these remote nodes.

If the best-match node is closer to the repair originator than any known nodes, the repair originator sends a repair message to the nodes in the top level of its cache. For each node in the top level, the repair message includes the peer ID of that node, address information for one the best-match node, and a repair level of 1. The repair level indicates which level of the cache includes the nodes to which the recipient is to forward the repair message after processing. If the best-match node is not closer to the repair originator than any known nodes, the repair originator sends a repair message to the best-match node.

In another embodiment of the invention, a node processes a repair message. The repair receiver receives a repair message including address information for a node. The repair receiver then sends a request message to the node asking for address information for the node most closely matching the peer ID of the repair receiver. This best-match node is returned to the repair receiver in a response message. If the repair receiver does not have an entry in its cache for the best-match node, the repair receiver determines that a split in the cloud exists. The repair receiver then informs nodes in its cache that a split exists, and sends them repair messages that include the address information of a node in the other partition.

In this embodiment, the repair receiver determines whether the best-match node belongs in the lowest cache level. If so, the repair receiver floods the best-match node's address information to each node in the lowest cache level. Those nodes in turn flood their address information to the best-match node. The repair receiver also sends its address information to the best-match node. The best-match node then floods the address information of the repair receiver to nodes in its cache, who in turn floods their address information to the repair receiver. The repair receiver records the address information for these remote nodes.

If the best-match node is closer to the repair receiver than any known nodes, the repair receiver sends a repair message to the nodes in the level of its cache corresponding to a repair level indicated in the received repair message. For each node in this level, the repair message includes the peer ID and address information for one of the remote nodes, and a repair level equal to the received repair level plus one. If the best-match node is not closer to the repair receiver than any known nodes, the repair receiver sends a repair message to the best-match node.

In yet another embodiment of the invention, nodes in the cloud periodically test for a cloud split. The frequency of the cloud-split tests is inversely proportional to the size of the cloud, thus providing scalability to the invention. The size of the cloud is estimated according to the number of levels in the cache and the ratio of the number space covered by each level.

Additional features and advantages of the invention are made apparent from the following detailed description of illustrative embodiments which proceeds with reference to the accompanying figures.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 7 is a block diagram representation of a REPAIR message.

Figure 1A:
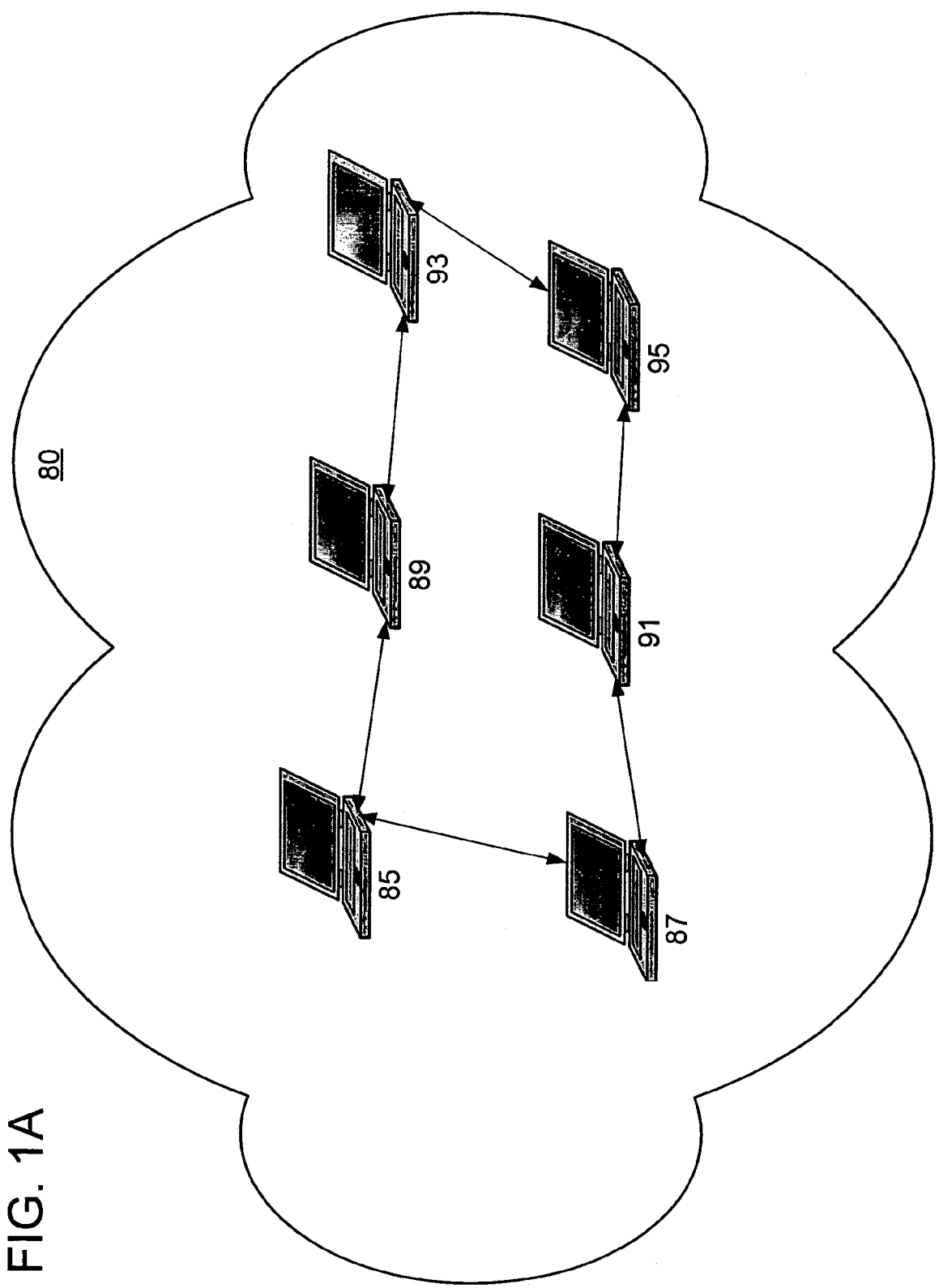
FIG. 1A is a block diagram of a peer-to-peer networking environment with several peer computing devices.

While the invention will be described in connection with certain preferred embodiments, there is no intent to limit it to those embodiments. On the contrary, the intent is to cover all alternatives, modifications, and equivalents as included within the spirit and scope of the invention as defined by the appended claims.

DETAILED DESCRIPTION OF THE INVENTION

Turning to the drawings, wherein like reference numerals refer to like elements, the present invention is illustrated as being implemented in a suitable computing environment. The following description is based on embodiments of the invention and should not be taken as limiting the invention with regard to alternative embodiments that are not explicitly described herein.

In the description that follows, the present invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the device in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

1. Suitable Environment for the Invention

The present invention provides a method for detecting and repairing cloud splits in a peer-to-peer (P2P) network. FIG. 1A illustrates the usefulness of such a system within a peer networking environment 80. The details of the communications technologies used are not of interest here, suffice it to say that the peer computing devices 85, 87, 89, 91, 93, and 95 in the peer networking environment 80 can, at least sometimes, communicate with one another via a communication topology represented by the double-ended arrows. The "at least sometimes" caveat comes from a fundamental feature of peer-to-peer networking: peer devices are constantly entering, leaving, and moving around the peer networking environment 80. To establish communications, peer devices track one another, noting arrivals and departures. Making this tracking task more interesting, the physical addresses and other important communications parameters of the peer devices change as the peers move. Upon the peer devices themselves lies the responsibility for gathering current information and for keeping that information up-to-date.

Figure 1B:
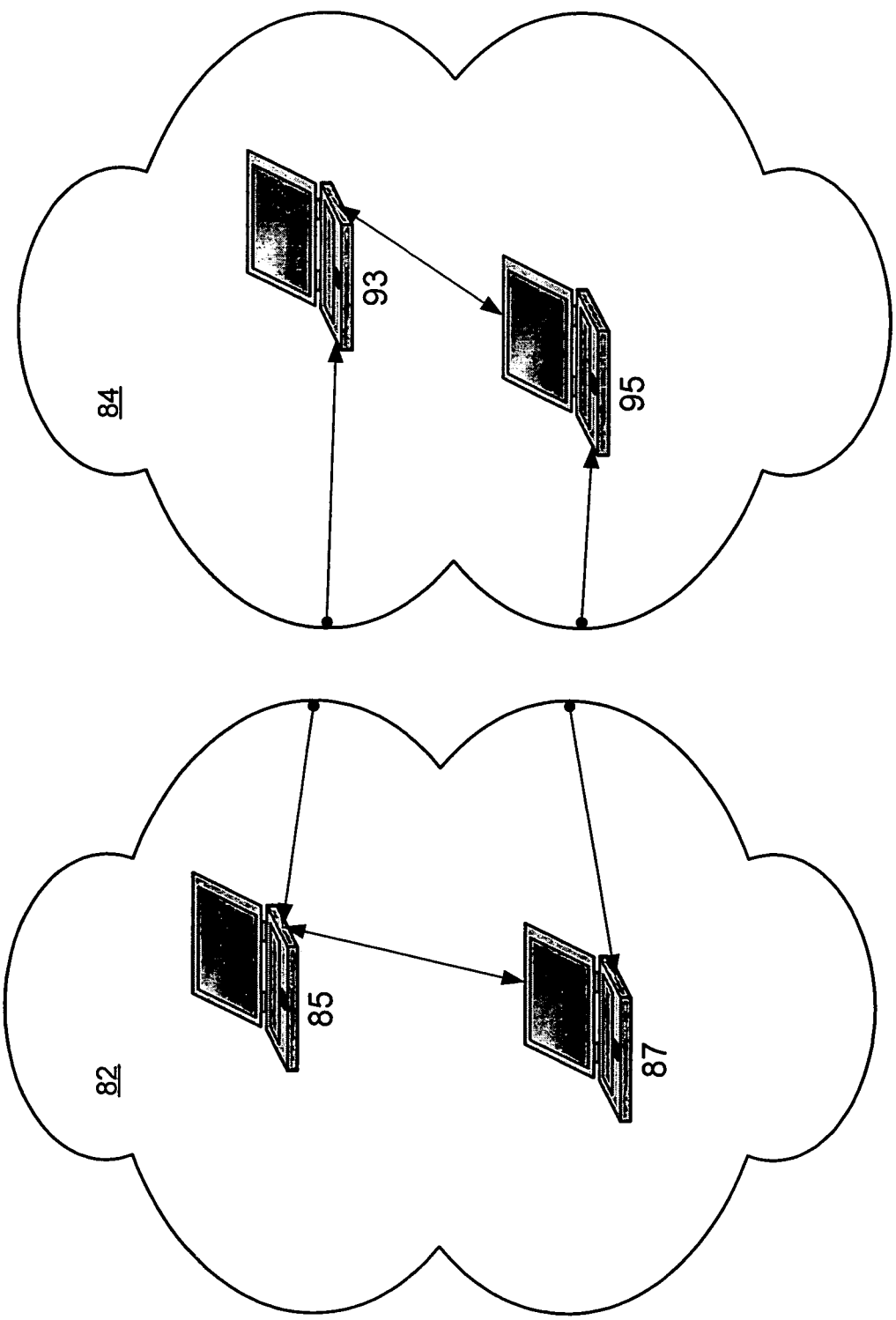
FIG. 1B is a block diagram of the peer-to-peer networking environment of FIG. 1A after a cloud split has occurred.

One difficulty in keeping that information up-to-date is detecting whether or not a "split" has occurred in a peer networking environment, or cloud. FIG. 1B illustrates a cloud split resulting from node failures occurring at peer computing devices 89 and 91 of FIG. 1A. The result is that the peer computing environment 80 of FIG. 1A has "split" into two partitions: peer computing environment 82 including peer networking devices 85 and 87, and peer networking environment 84 including peer computing devices 93 and 95. Thus, peer computing devices 85 and 87 can no longer communicate with peer computing devices 93 and 95. Accordingly, the present invention discloses a method for detecting and repairing such a cloud split.

Figure 1C:
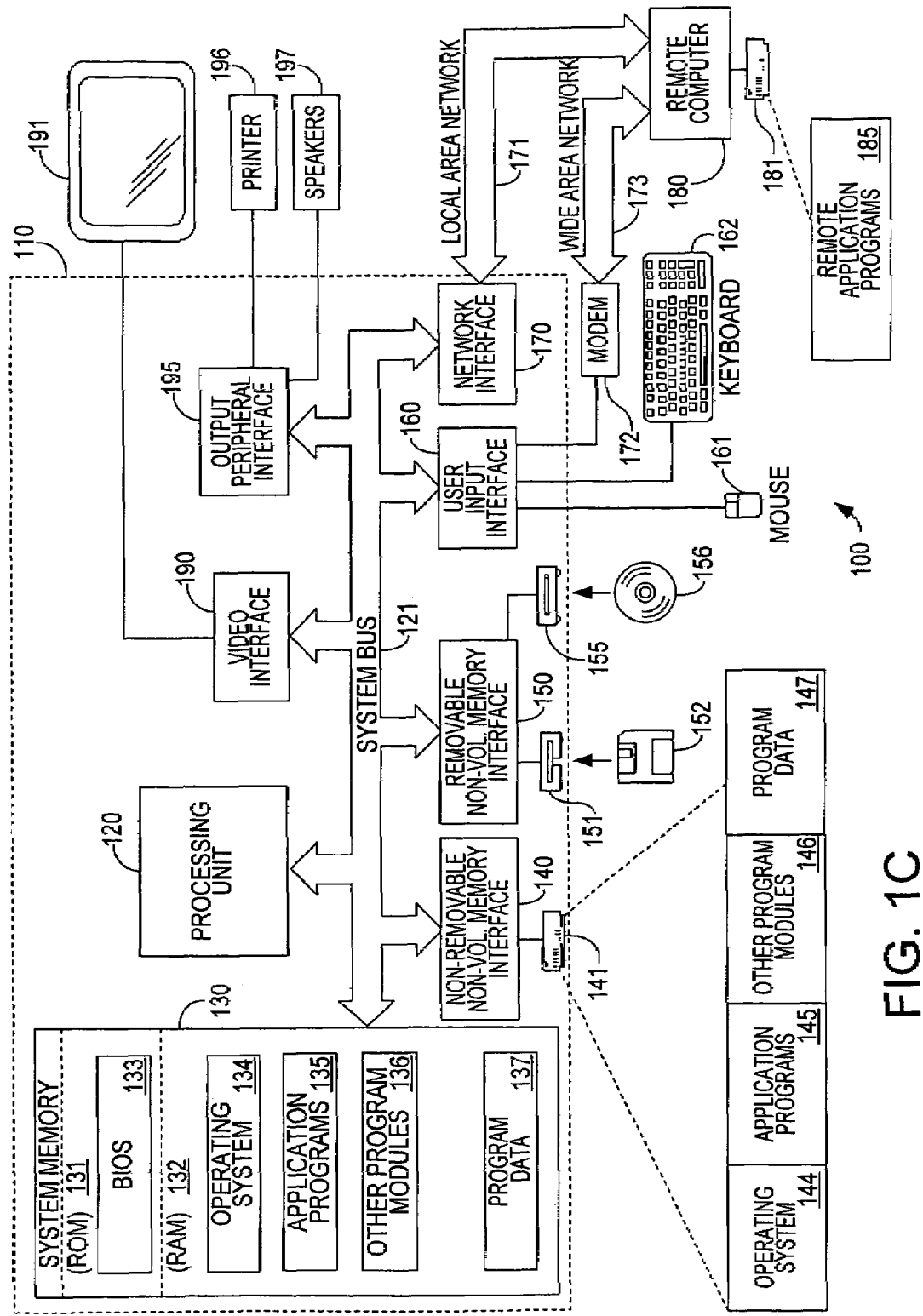
FIG. 1C is a block diagram generally illustrating an exemplary computer system on which the present invention resides.

FIG. 1C illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary computing environment 100.

The invention is operational with numerous other general-purpose or special-purpose computing system environments or configurations. Examples of well known computing systems, environments, and configurations that may be suitable for use with the invention include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer-storage media including memory-storage devices.

With reference to FIG. 1C, an exemplary system for implementing the invention includes a general-purpose computing device in the form of a computer 110. Components of the computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture bus, Micro Channel Architecture bus, Enhanced ISA bus, Video Electronics Standards Associate local bus, and Peripheral Component Interconnect bus, also known as Mezzanine bus.

The computer 110 typically includes a variety of computer-readable media. Computer-readable media can be any available media that can be accessed by the computer 110 and include both volatile and nonvolatile media, removable and non-removable media. By way of example, and not limitation, computer-readable media may include computer storage media and communication media. Computer storage media include both volatile and nonvolatile, removable and non-removable media implemented in any method or technology for the storage of information such as computer-readable instructions, data structures, program modules, or other data. Computer storage media include, but are not limited to, RAM, ROM, EEPROM, flash memory or other memory technology, CD-ROM, digital versatile disks or other optical disk storage, magnetic cassettes, magnetic tape, magnetic disk storage or other magnetic storage devices, or any other medium which can be used to store the desired information and which can be accessed by the computer 110. Communication media typically embody computer-readable instructions, data structures, program modules, or other data in a modulated data signal such as a carrier wave or other transport mechanism and include any information-delivery media. The term "modulated data signal" means a signal that has one or more of its characteristics set or changed in such a manner as to encode information in the signal. By way of example, and not limitation, communication media include wired media such as a wired network or direct-wired connection and wireless media such as acoustic, RF, infrared, and other wireless media. Combinations of the any of the above should also be included within the scope of computer-readable media.

The system memory 130 includes computer storage media in the form of volatile and nonvolatile memory such as read only memory (ROM) 131 and random access memory (RAM) 132. A basic input/output system 133 (BIOS), containing the basic routines that help to transfer information between elements within the computer 110, such as during start-up, is typically stored in ROM 131. RAM 132 typically contains data and program modules that are immediately accessible to or presently being operated on by the processing unit 120. By way of example, and not limitation, FIG. 1C illustrates an operating system 134, application programs 135, other program modules 136, and program data 137.

The computer 110 may also include other removable/non-removable, volatile/nonvolatile computer storage media. By way of example only, FIG. 1C illustrates a hard disk drive 141 that reads from or writes to non-removable, nonvolatile, magnetic media, a magnetic disk drive 151 that reads from or writes to a removable, nonvolatile, magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary computing environment 100 include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as the interface 140, and the magnetic disk drive 151 and the optical disk drive 155 are typically connected to the system bus 121 by a removable memory interface, such as the interface 150.

The drives and their associated computer storage media discussed above and illustrated in FIG. 1C provide storage of computer-readable instructions, data structures, program modules, and other data for the computer 110. In FIG. 1C, for example, the hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers to illustrate that, at a minimum, they are different copies.

A user may enter commands and information into the computer 110 through input devices such as a keyboard 162 and a pointing device 161, commonly referred to as a mouse, trackball, or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port, or a universal serial bus. A monitor 191 or other type of display device is also connected to the system bus 121 via an interface, such as a video interface 190. In addition to the monitor 191, the computer 110 may also include other peripheral output devices such as speakers 197 and a printer 196 which may be connected through an output peripheral interface 195.

The computer 110 may operate in a networked environment using logical connections to one or more remote computers, such as a remote computer 180. The remote computer 180 may be another personal computer, a server, a router, a network PC, a peer device, or other common network node and typically includes many or all of the elements described above relative to the personal computer 110 although only a memory storage device 181 has been illustrated in FIG. 1C. The logical connections depicted in FIG. 1C include a local area network (LAN) 171 and a wide area network (WAN) 173 but may also include other networks. Such networking environments are commonplace in offices, enterprise-wide computer networks, intranets, and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the personal computer 110, or portions thereof, may be stored in the remote memory storage device 181. By way of example, and not limitation, FIG. 1C illustrates the remote application programs 185 as residing on the memory device 181. It will be appreciated that the network connections shown are exemplary, and other means of establishing a communications link between the computers may be used.

In the description that follows, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

2. PNRP Cloud-Split Detection and Repair

As introduced above, the success of a peer-to-peer (P2P) protocol depends on the protocol's ability to detect and repair cloud splits. A peer-to-peer name resolution protocol (PNRP) to which the cloud-split detection and repair methods of the instant invention find particular applicability is described in co-pending, commonly assigned application Ser. No. 09/942,164, entitled "Peer-To-Peer Name Resolution Protocol (PNRP) and Multilevel Cache for Use Therewith," filed on Aug. 29, 2001, the teachings and disclosure of which are hereby incorporated in their entireties by reference thereto. However, one skilled in the art will recognize from the following teachings that the cloud-split detection and repair methods of the present invention are not limited to the particular peer-to-peer protocol of this co-pending application but may be applied to other protocols with equal force.

The PNRP service execution, as disclosed in the above-incorporated co-pending application, is discussed below in four sections. The first section describes a method for nodes to discover and join a PNRP cloud. In section two, node identification is described wherein nodes register a Peer Name that can be resolved to a network endpoint using PRNP. The third section describes the multilevel cache that is maintained by each node in the cloud. In the fourth section, PNRP messages are described, and a method for using those messages to resolve Peer Names is discussed. In view of this description, methods of performing cloud-split detection and repair are then described in accordance with the present invention.

2.1 PNRP Cloud Discovery

PNRP relies on a cloud of transient nodes to resolve PNRP IDs into addresses. The PNRP protocol ensures that, once joined to a PNRP cloud, a node can successfully register and resolve PNRP IDs until it chooses to leave the cloud. Like many discovery protocols, PNRP requires a method of "bootstrapping" to learn enough to participate in resolution. Bootstrapping requires a new PNRP node to find another node already in the cloud. The process of finding such a node is called cloud discovery. If cloud discovery fails, a PNRP node assumes it is the first PNRP node in the cloud.

Cloud discovery is accomplished through four different mechanisms:

1) Persisted cache: Each time a PNRP node leaves a cloud, it persists its cache to disk. To re-enter the cloud, a node may attempt to connect to some of the nodes specified in the persisted cache, with preference given to unexpired CPAs (explained herein), then to CPAs which have the longest inception-to-expiration date (implying a permanent, always-on IP address). There should be a persisted cache for each cloud that was active.

2) Supplied node address: The addresses of known nodes may be configured. These nodes may be polled to determine if they have a valid cache that can be used for bootstrapping.

3) SSDP cloud discovery: PNRP nodes are required to register themselves in Simple Service Discovery Protocol (SSDP). Nodes wishing to join the cloud may issue an SSDP MSEARCH for nearby SSDP nodes already in the cloud.

4) Domain Name Service (DNS) cloud discovery: The node uses DNS to locate "well-known" PNRP nodes registered in a DNS. The DNS name of the well-known node can be stored in the local PNRP node's configuration for use at start-up time. Alternatively, mechanisms such as DNS service record (SRV) entries can be used to advertise and discover well-known PNRP nodes. If none of these mechanisms works, the PNRP node marks the cloud state indicating it was not able to locate an existing PNRP cloud, and then continues executing as the first node in a new cloud.

Using any of the above mechanisms, once a node N has discovered another node C already in the desired cloud, C provides N with a copy of the top level of C's cache upon request. N will then have enough information to participate in PNRP ID resolution and will be a member of the cloud.

2.2 PNRP Node Identification

PNRP allows peer applications to register a Peer Name-to-endpoint mapping and to resolve a Peer Name to obtain the endpoint. A Peer Name is a string that identifies a peer resource. A registered Peer Name-to-endpoint mapping is called a certified peer address, or CPA. To create a CPA, an application must have access to a public/private encryption key pair. The key pair is used to sign the CPA to avoid tampering. A Peer Name may also be derived from a public key, to prove authorization of name publication.

In some embodiments, an endpoint is one IPv6/Ipv4 address, port, and protocol (e.g. Transmission Control Protocol (TCP) or User Datagram Protocol (UDP)). A list of endpoints may be registered with a single Peer Name. The list is returned when the Peer Name is resolved. A node is an instance of the PNRP protocol service, and there is normally one node per computer. A cloud is a network of nodes that can communicate with each other. A single node may be connected to more than one cloud. A cloud has a scope property that is equivalent to the scopes defined in IPv6: Global, Site Local, and Link Local. A node may belong to multiple Site Local clouds and multiple Link Local clouds. Communication between nodes should never cross from one cloud to another, therefore cloud names are used to distinguish clouds. A Peer Name may be registered on more than one node; PNRP keeps each registration distinct. In this case, the endpoint list associated with each Peer Name instance is different.

Within a node, it is also possible to register a Peer Name on more than one cloud to which that the node is connected. Each of these registrations is distinct. Normally the endpoint list will be different in each of these instances as well. When a node tries to resolve a Peer Name, it does this on a selected cloud. The resolve will succeed only if the Peer Name is registered in the same cloud. It is possible to resolve a Peer Name on more than one cloud simultaneously, but these are treated as independent resolve requests.

Peer Names are converted into 128-bit numbers called P2P IDs by hashing the Peer Name. The same Peer Name always produces the same P2P ID. A specific instance of a Peer Name registration also has a 128-bit number called a service location. The two together make a 256-bit number called the PNRP ID. The service location portion of the PNRP ID makes the specific instance of the Peer Name registration unique in the network. An application may register a Peer Name, a PNRP ID is created from the name, and messages are sent informing other nodes of the registration. The same Peer Name may be registered on more than one node. The P2P ID will be the same on each node, but the PNRP ID should be unique for each node. However, a node may have more than one PNRP ID registered on that node. References to a "node" herein shall mean a single PNRP ID that is registered on that node, while it is understood that the node may have other PRNRP IDs associated with it.

An application may ask to resolve a Peer Name to an address. A P2P ID is derived from the Peer Name, and messages are sent to other nodes to locate a node that has this P2P ID registered. When a P2P ID is resolved into an address, a certified peer address (CPA) is returned. This CPA includes the target's PNRP ID, current IP addresses, public key, and other fields explained later. The CPA is signed to prevent tampering.

A given P2P ID may be registered by many different nodes. PNRP uses a "service location" suffix to ensure each registered instance has a unique PNRP ID. A "service location" is a 128-bit number corresponding to a unique network service endpoint. The value is created by combining the IPv6 address, port, protocol, and part of the public key. Service locations should be considered opaque by PNRP clients. A service location has two important properties: 1) at any moment, a service location identifies a unique instance of a Peer name; and 2) when two service locations are compared, the length of the common prefix for each is a reasonable measure of network proximity. Two service locations which start with the same four bits are usually no further apart than two which start with the same three bits. These benefits may apply only for Global scope native unicast IPv6 addresses.

A Peer Name is a string used to identify a Peer resource. PNRP provides a mechanism for making a peer resource discoverable by registering a Peer Name, and it provides a mechanism for resolving a Peer Name to an IP address and port. There are two types of Peer Names, secure and unsecured. A secure Peer Name has a verifiable relationship to a public key. This provides a proof of ownership of the name. A node must have access to the private key associated with the public key used to create the secure Peer Name in order to prove ownership. An unsecured Peer Name does not have a relationship to a public key. Any node can claim ownership to any unsecured Peer Name.

A Peer Name has the format <Authority>.<Classifier>. The Authority part is made up of printable hexadecimal characters. The Classifier part is specified by the application and can be any UNICODE string. The Classifier string is limited to 150 characters including the terminating null character. A secure Peer Name is a name that has a non-zero authority as the first part of the name. The authority is created from the public key that is associated with the secure Peer Name, by using the SHA hash. This produces a 160 bit number. The 160 bit number is converted to characters by doing a conversion to hexadecimal. This creates a 40 character Authority String. Thus, AuthorityHash=SHA(Public Key), and Authority=ConvertToHex(AuthorityHash). An unsecured Peer Name is one that has an Authority component of "0": Unsecured Peer Name=0.<Classifier>. In this case the Authority is not 40 characters long.

The P2P ID is a 128 bit number that is derived from the Peer Name and a special 32 bit number, Goo, which has a value of 0x504e5250 (ANSI Encoding of "PNRP"). Thus, P2P ID=MD5(SHA(Classifier), AuthorityHash, SHA(Classifier), Goo). For unsecured Peer Names, the AuthorityHash is 160 zero bits.

The Service Location portion of the PNRP ID is also 128 bits long. Its most important property is that it should be unique at a given moment. This is done by including components from the address, port, protocol, and the actual key (in case several applications are sharing a port). To get some benefit of the IPv6 address locality, we keep the upper 64 bits of the IPv6 address as is. Thus, Service Location=(SL Upper <<64) 1 (SL Lower); SL Upper=Upper 64 bits of IPv6 Address for service OR application specified; and SL Lower=MD5(Public Key, Application Service Addresses). The PNRP ID is the concatenation of the Service Location and the P2P ID: PNRP ID=(P2P ID<<128)|(Service Location).

A Certified Peer Address is a signed structure that contains information about a Peer endpoint. The information in a CPA includes: an authority hash, the SHA hash of the classifier string, a Comment (40 character text field filled by application); a validity interval for the CPA, the public key of the identity registering the Peer Name, endpoints for reaching the application service; endpoints for reaching the PNRP service, and the signature of the CPA based on a public/private Key pair. Each Peer Name that is registered has a CPA. There must be a private/public key pair held by the registering entity that is used to sign the CPA and validate the identity of the CPA source. When a Peer Name is resolved, the CPA is returned to the peer that initiated the RESOLVE message. This allows for identity authorization, as well as ensuring that the data are not tampered with.

2.3 PNRP Cache Maintenance

Each PNRP node maintains a cache of Peer Name-to-endpoint mappings for some other nodes in a cloud. Messages are exchanged between nodes to distribute information about Peer Names to nodes in the cloud. It is the responsibility of each node to maintain its cache properly. The PNRP protocol defines a numerical namespace, and each Peer Name is converted to a number in the namespace. The numbers can be compared to determine proximity in the namespace. When a request to resolve a Peer Name arrives at a node, it can compare the number corresponding to the Peer Name with numbers in its cache to find a node that is numerically closer to the desired node. The recipient of the request then forwards that request to the closer node. In this way the resolve request is passed from node to node, getting closer to its target with each hop.

A PNRP cache is a collection of CPAs representing knowledge about select participants in the PNRP cloud. A computer maintains a separate PNRP cache for each cloud. From the PNRP cache perspective, each CPA in the cache contains a PNRP ID and a PNRP network endpoint. The cache is maintained as a multilevel structure. Each level represents a segment of the total PNRP ID number space. The top level of the cache spans the entire number space. The next level down spans a smaller segment of the number space, clustered around a locally registered PNRP ID. Each subsequent level spans a progressively smaller part of the number space, always around the same PNRP ID. There are a maximum number of entries allowed at each cache level.

As a Peer learns about other Peers, it adds their CPAs to its cache. The cache level for the new CPA is chosen based on the distance between its local PNRP ID and the new PNRP ID. If the Peer adds the new CPA to the lowest level, and the lowest level is already full, then a new lowest level is added. If it adds the CPA to some other level and the level is already full, it replaces an existing entry with the new entry or discards the new entry. Periodic maintenance of the cache must be done to ensure it is valid. CPAs that have expired are removed from the cache. If there are gaps in a cache level due to expiration of CPAs or a poor numerical distribution of PNRP IDs, then the Peer actively tries to discover Peers to fill in the gaps. If a node has multiple locally registered Peer Names, then each of the PNRP IDs needs to have a clustering of CPAs around the PNRP ID. This can be implemented as one cache per locally registered ID, or as a set of "cache views" on a shared set of cached data, whichever best meets the need of the PNRP implementation.

Figure 2:
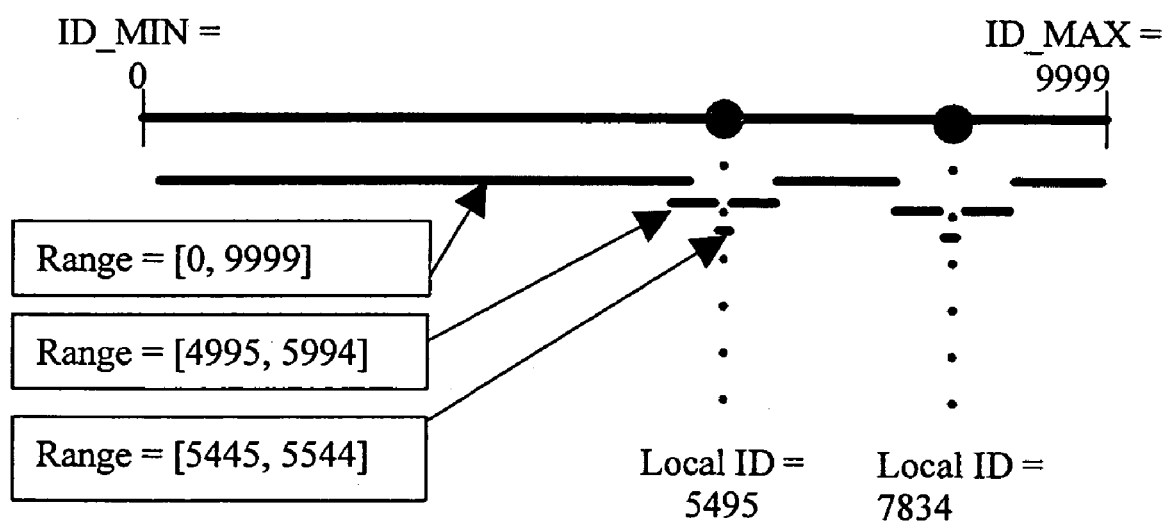
FIG. 2 is a schematic illustrating a multilevel cache according to one embodiment of the present invention.

As an illustration, FIG. 2 shows a cache with a number space from 0 to 9999, with locally registered IDs 5495 and 7834. Each cache level covers 1/10th of the number space of the previous level. In this case there are 3 levels for each ID, but their cache views share the top level. The PNRP cache is structured in this fashion to help ensure that name resolution takes O(logk N) hops on average, where 'k' is the factor by which each cache level's scope is reduced, and N is the number of names registered in the PNRP cloud.

For the purpose of this discussion, a cache may be a stand-alone cache, or a 'cache view' of a cache shared across many locally registered PNRP IDs. A PNRP node may participate in more than one PNRP cloud. A cloud is normally associated with distinct network scopes (Global, Site Local, Link Local) and distinct networks (different Site, different Link Local interface). There is one cache for each PNRP ID registered in each cloud. If the same PNRP ID is registered in three clouds, there will be three independent caches, one per registration. Each cache is structured as a set of cache levels. Each cache level can hold an identical number of cached CPAs. Each cache level covers a part of the number range of a circular number space. The top level (0) encompasses the entire number space and has the least density. Each level down (1, 2, . . . ) represents a narrower range of the number space, with increasing density. Each cache level's number range is centered on the locally registered PNRP ID.

Figure 3:
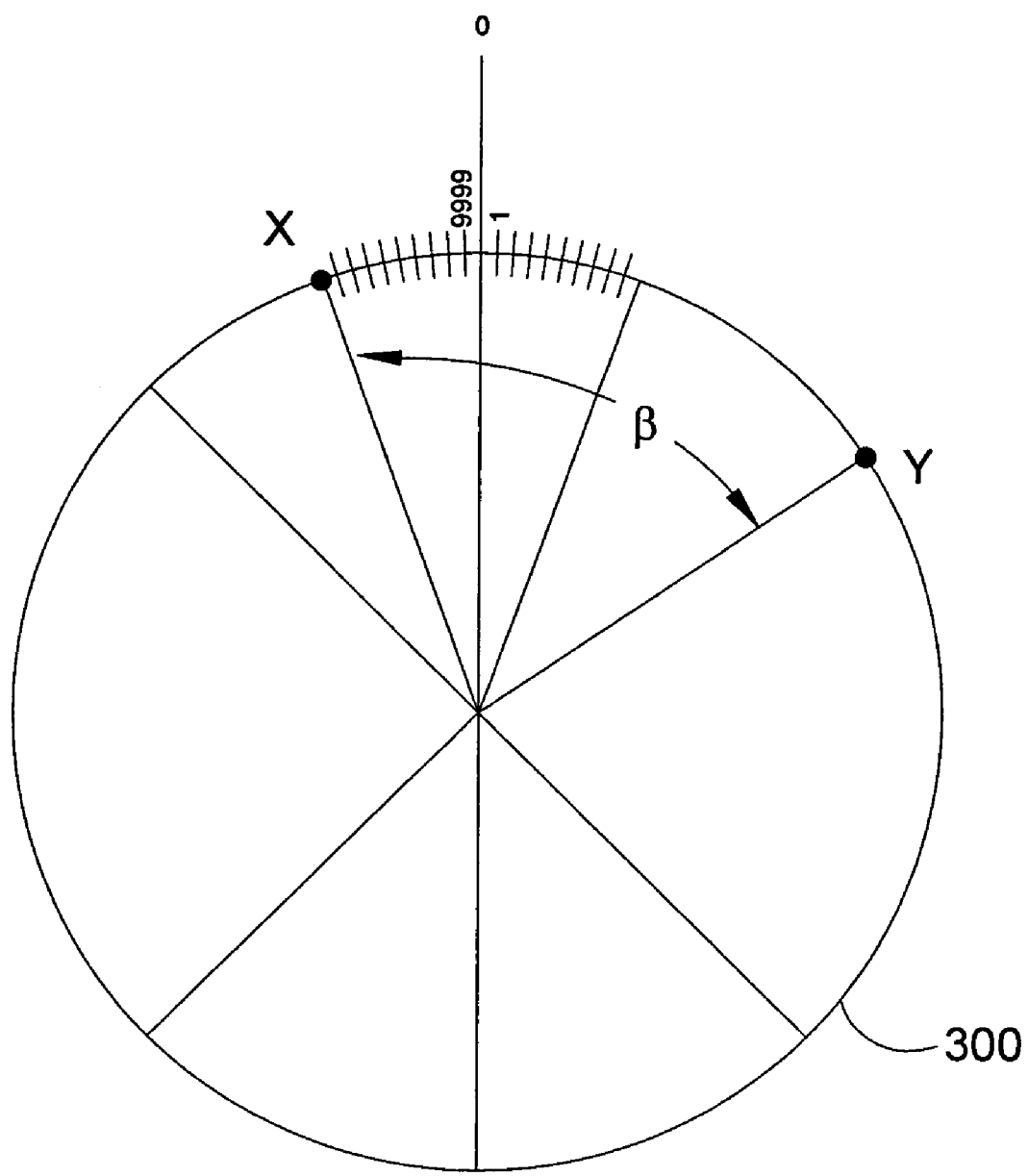
FIG. 3 is a schematic of a circular number space according to the present invention.

The distance between two nodes is determined by calculating the distance between their PNRP IDs in the circular number space. FIG. 3 illustrates an exemplary circular number space 300 where the minimum MIN of the number space equals 0 and the maximum MAX of the number space equals 9999. Nodes X and Y have each instantiated a PNRP ID in this number space 300. The distance between nodes X and Y is shown as $\beta$, and is expressed by the equation:

IF (X>Y)

THEN $\beta$=X-Y

ELSE $\beta$=Y-X

IF $\beta$>(MAX-MIN)/2

THEN $\beta$=(MAX-MIN)/2-$\beta$

Each cache level is split in half, with half of the entries reserved for PNRP IDs less than the locally registered PNRP ID modulo $2^{256}$, and the other half for entries with IDs greater than the locally registered PNRP ID. PNRP IDs less than the locally registered ID are considered on the "left side" of the PNRP ID, and those greater are on the "right side" of the PNRP ID. This division helps mitigate complications caused by clustering of known PNRP IDs on one side of the registered PNRP ID. A cache entry is information about a remotely registered PNRP ID that has been learned via the PNRP protocol. The cache entry data includes the relevant CPA, flags indicating whether identity authorization is needed, and a metric describing how trusted the entry is.

Cache entries are added to a cache as a result of learning new CPAs (described later). Before adding a CPA to the cache, the CPA must be validated. The size must be within the expected range, no more than 676 bytes. This limit allows PNRP messages containing CPAs to stay within the IPv6 maximum transmission unit (MTU) of 1280 bytes. The CPA and PNRP version numbers must correspond to versions understood by the local PNRP implementation. The validity times are checked to determine if the CPA is valid. It is recommended that validity times be honored with a skew of up to one hour. The CPA signature is verified to ensure it has not been tampered with. The addresses in the CPA are verified to ensure they're in the expected IPv6 network scope.

Once the CPA is validated, a test is performed to see if the PNRP ID belongs in the lowest cache level. If it does, a list is constructed including a set of neighbors to which the CPA should be flooded. The CPA is not actually flooded until authorization has been verified. A trust level is assigned to the CPA, based on how it was learned. If the PNRP ID in the CPA is one which is registered locally, the CPA is discarded because it does not need to be placed in the PNRP cache. If the CPA belongs in a lower cache level, and a revoke flag in the CPA is not set, an INQUIRE message is sent to the node identified in the CPA to verify that the PNRP ID identified in the CPA is registered at that node. The CPA will not be cached unless this authorization successfully completes.

If the revoke flag is set and an older CPA with the same PNRP ID is found in the cache, the matching older CPA is removed from the cache. If the matching older CPA was in the lowest cache level, the revoked CPA is flooded to the nearest neighbors. If the revoke flag is not set, the CPA should be added to the cache. To add an entry to a view, the node first determines in which cache level the new PNRP ID belongs. If there is space in the level for another entry, the CPA is added to that cache level. If the level is full, a determination is made if the new ID belongs to the lowest level. If it does, then a new lowest level will be created. Cache entries from what used to be the lowest level are evaluated to see if they belong to the new lowest level, and if so, they are moved. After this the node again tries to add the new entry to the cache view. If the full level is not the bottom level, then the node looks for a candidate entry to remove from the cache level to make space for the new entry. If replacement selection finds an entry which can be removed and replaced with the new entry, the new entry is added. PNRP nodes regularly receive new information for their cache by processing PNRP messages. However, this may not provide enough data for a node to ensure its cache is well-formed and current. The node should periodically perform some maintenance actions on its own.

The frequency of the maintenance actions may vary according to the node's state. If the node has recently joined a cloud or if a new PNRP ID has been registered, it may perform maintenance more frequently to reach a well-formed cache. On the other hand, a node that has been synchronized and that receives frequent messages from other nodes may need to do maintenance less frequently. Cache synchronization should be a periodic event. A suggested period is on the order of every 10 minutes. The amount of work done for each period should also be limited, to avoid using too much CPU time and bandwidth during a single maintenance occurrence. It may be better to do more frequent maintenance actions with smaller amounts of work for each period.

The specific tasks that may be performed during a maintenance action are the following: 1) remove expired CPA entries from the cache; 2) make a probabilistic check to see whether this node should perform partition detection; 3) balance cache entries within each cache level; and 4) check to see if the cache needs to be synchronized again. Removing expired CPA entries from the cache is simply a question of checking the validity date and time of the CPA, and comparing it to the current time. If the time is not within the valid times for the CPA, the cache entry may be removed from the cache. Since times are not synchronized across nodes, some leniency should be allowed when doing the comparison.

2.4 PNRP Name Resolution

Before discussing the actual resolution procedure of the PNRP protocol usable with the present invention, it is instructive to discuss exemplary message and data formats appropriate in the protocol of the present invention. The PNRP protocol consists of ten different types of messages. These are explained at a high level below. A RESOLVE message requests resolution of a target PNRP ID into a CPA. A RESPONSE message returns the result of a completed RESOLVE request. A FLOOD message contains a CPA intended for the PNRP cache of the recipient. A SOLICIT message asks a PNRP node to ADVERTISE its top level cache. An ADVERTISE message contains a list of PNRP IDs for CPAs in a node's top level cache. A REQUEST message asks a node to flood a subset of ADVERTISEd CPAs. An INQUIRE message asks a node whether a specific PNRP ID is registered at that node. An AUTHORITY message confirms local registration of a PNRP ID, and optionally provides a P2P group membership certificate (GMC) chain to help validate the CPA for that PNRP ID. An ACK message acknowledges receipt and/or successful processing of certain messages. A REPAIR message tries to merge clouds that may be split. The RESOLVE, RESPONSE, FLOOD, and REPAIR messages, which are used in the method of cloud-split detection and repair of the immediate invention, are explained in greater detail below. It should be noted that in this application the names of the messages are used merely to facilitate an understanding of their functionality, and should not be taken as limiting the form or format of the packets or messages themselves.

A request message contains the message code, RESOLVE, a TargetID being the PNRP ID of the target of the RESOLVE request, the NextHop being the PNRP ID of the next node to receive the message, MaxHops being the maximum number of hops allowed for this message, a BestMatch being a CPA for a closest match to the TargetID, and a Path that contains a list of addresses for each node that processed the RESOLVE. Entries in the Path include an indication of whether the node accepted or refused the RESOLVE. When the RESOLVE is originated, the requesting node sets the TargetID to the desired PNRP ID, the NextHop to a PNRP ID selected from its cache, the BestMatch to a locally registered CPA, and the Path to include the source address of the host node.

A response message contains the message code, RESPONSE, a TargetID being the PNRP ID of the target of the RESOLVE request, a BestMatch being the CPA of the node that best matched the RESOLVE request, and a Path that contains a list of addresses for each node that processed the RESOLVE. Nodes get removed from the response list as the message makes its way towards the RESOLVE originator. A FLOOD message contains the message code, FLOOD, the CPA that is being flooded, a list of all nodes that have already received a copy of the CPA, containing for each node the address of the node. Nodes get added to the list as the flooding progresses.

Having now described a set of messages applicable to the protocol of the present invention, attention is now turned to the resolution procedure introduced above. Specifically, the query resolution procedure is the process by which Peer Names are resolved to endpoint addresses. The node that requests a resolution formats a RESOLVE message according to the specification discussed above, and forwards that message to the the next closest neighbor to the target. The node that receives a RESOLVE processes it, and can either send back a RESPONSE, forward the RESOLVE to another node, or send back a refusal if it cannot process the RESOLVE.

A node P initiates a RESOLVE message with TargetID set to a desired PNRP ID, NextHop set to a PNRP ID selected from the cache, MaxHops set to a constant or relative to estimated cloud size, BestMatchset the CPA for a locally registered Peer Name, and Path set to the source address and port. The RESOLVE message is then forwarded to some other node for processing. When a node Q wants to forward a RESOLVE to another node, the NextHop must first be chosen. To choose the NextHop, the node Q makes a list L of the three cached CPAs with PNRP IDs closest to the TargetID, excluding any whose address is already listed in Path, and those which are not closer to the TargetID than Q's closest locally registered ID. If the list L is not empty, then one entry is chosen at random. In other words, Q finds some new nodes that are closer to the TargetID than this node, and chooses one of them.

If Q was able to select a NextHop, Q adds itself to the Path, choosing its best address for the selected next hop, and marking its Path entry as Accepted. Q sets NextHop to the selected destination's PNRP ID, and forwards the RESOLVE. If Q was not able to find a NextHop, Q sends the RESOLVE back to the last node in Path that is marked as Accepted. Q first adds itself to the Path, choosing its best address for the destination node, and marking the entry Rejected. If Q was not able to find a NextHop, and there are no nodes in the Path (besides itself), then Q is the originator of the RESOLVE. In this case, the RESOLVE has failed, obtaining only a BestMatch.

A Node Z receives a RESOLVE message R containing a target PNRP ID, a BestMatch CPA, a NextHop PNRP ID, and a Path listing the address of all nodes that have processed the RESOLVE. Z checks that the Path array contains at least 1 address marked as Accepted, and that the last such address is the same as the source of the message. If not, no further processing is done. Z checks that the NextHop ID is registered locally. If this fails, it responds indicating that the NextHop PNRP ID is unknown, and processing is complete. The receiver of this response is responsible for adding the rejecting node endpoint to the Path array and re-routing the RESOLVE request elsewhere. Z checks if there is already an entry for Z in the Path. If there is, then there is a loop, and Z responds indicating a loop is present, and processing is complete. The response receiver is responsible for adding the rejecting node endpoint to the Path array and re-routing the RESOLVE request elsewhere.

Z checks whether it has a locally registered CPA that is a better match than the current BestMatch. If it does it replaces the BestMatch with this one. Z checks whether it has a CPA that satisfies the RESOLVE criteria, based on the TargetID. If it has a match, or if the number of entries in the path is greater than or equal to MaxHops, then Z creates a RESPONSE message S with the current BestMatch. The RESOLVE message R's path is copied to S's path. Z sets a response code to indicate either that the target was found or that the MaxHops limit was reached. Z removes its address from path as well as subsequent entries marked Rejected, and sends the RESPONSE to the most recent entry in path that is marked Accepted. If Z did not send a RESPONSE, then it tries to forward the RESOLVE to a next node by following the procedure previously described.

Node P receives a RESPONSE message S containing a TargetID PNRP ID, a BestMatch CPA, and a path listing the address of all nodes which have processed the RESOLVE. P checks the Path to ensure that its address is the last one (most recent) on the Path, and that it is marked as Accepted. P removes itself from the Path, and P also removes the previous entries that are marked Rejected, until it encounters an entry marked Accepted, or until the list is depleted. If an entry marked as Accepted is found, then P forwards the RESPONSE to this node. If there are no more entries in the Path, and P is the originator of the original RESOLVE, then the RESOLVE procedure is complete. P obtains the BestMatch from the RESPONSE message and compares it to the TargetID. If they are the same, the RESOLVE was a success.

When a node receives a FLOOD message it adds the CPA of the message to its cache. However, if the CPA is for a PNRP ID that is registered locally on the same node, then there is no need to add it to the cache. The entry may or may not be added if another entry needs to be removed to make room for it, and all relevant existing entries are preferred due to higher trust levels or better proximity metrics. If the entry belongs to the lowest cache level, then it should always be added to the cache, and flooded to the nearest neighbors.

If the FLOOD needs to be forwarded, then neighbors whose PNRP IDs are closest to the locally registered ID are placed in a list. Any neighbors who have already received the FLOOD (as determined by the FLOOD's flooded list) are removed from the list. A FLOOD message is sent to each neighbor remaining in the list, containing the FLOODed CPA, and a Flooded List that includes the neighbors, plus contents of the Flooded List received in the original FLOOD message.

When a CPA is added to the cache's lowest level, the added CPA is flooded to the n peers closest to the locally register ID. The value of n may be tuned, but a value of 4 expected to work well. If the reason for adding a CPA is due to receiving a FLOOD, then the CPA should not be flooded to nodes whose address is in the Flooded List of the received FLOOD. The addresses in the received Flooded List should be copied to the new FLOOD message Flooded List if there is enough room. When a FLOOD is received for a new Peer, and the CPA is added to the cache's lowest level, the receiver checks to see whether the FLOOD was received from the peer specified in the CPA. If the FLOOD was received from a node other than the node specified in the CPA, the local node assumes the node specified in the CPA is a new neighbor. The local node sends a FLOOD message to its new neighbor, containing the local node's CPA. This process is called "backflooding."

2.5 PNRP Cloud-Split Detection and Repair

Having described the core Peer-to-Peer Name Resolution Protocol (PNRP) and multilevel cache for which the present invention finds particular applicability, a method of detecting and repair cloud splits via PNRP is now discussed. The repair mechanism relies upon having an alternative resolution mechanism to find a well-known PNRP node. Since this node must be a member of a single partition, it can be used by members of other partitions to detect cloud splits, and to gather enough information to initiate the repair process. An ideal choice for a well-known node is a node used for bootstrapping via DNS, also known as a cloud "seed server."

Nodes in a cloud periodically poll seed servers to test if the node has become isolated from the cloud to which the seed server belongs, and attempt to merge back if necessary. The frequency at which a node tests for a split is inversely proportional to its estimate of the cloud size. This keeps the number of split tests roughly constant, regardless of cloud size. Since cloud size estimation is based upon having a 'well-formed' PNRP cache, a node that has recently joined a cloud should wait until its cache size reaches a steady-state before assuming that it is able to estimate the cloud size.

The algorithm immediately below describes the split detection and repair process performed when a node decides to do split detection, or receives notification of a potential split. To enable merging of clouds, the PNRP REPAIR message is used. A REPAIR message, as depicted in FIG. 7, includes a PNRP ID to locate 710, an address 720 of a node which is postulated to be in a different partition (if there is a cloud split), and a repair level number 730. The repair level number 730 corresponds to the cache level to use for the repair test, where cache levels are numbered with 0 being the top level (broadest number range), and each subsequent level (smaller range) being 1 higher. When split detection is being performed for the first time, the REPAIR message PNRP ID 710 should be set to a locally registered PNRP ID, the address 720 should be set to that of a known seed server such as a node used for bootstrapping via DNS, and the repair level should be set to 0. When a node initiates split detection, it internally generates a REPAIR message, using the address of a known Seed Server as the address, a PNRP ID that is registered locally, and a level of 0. The initiating node processes this REPAIR itself.

Figure 4:
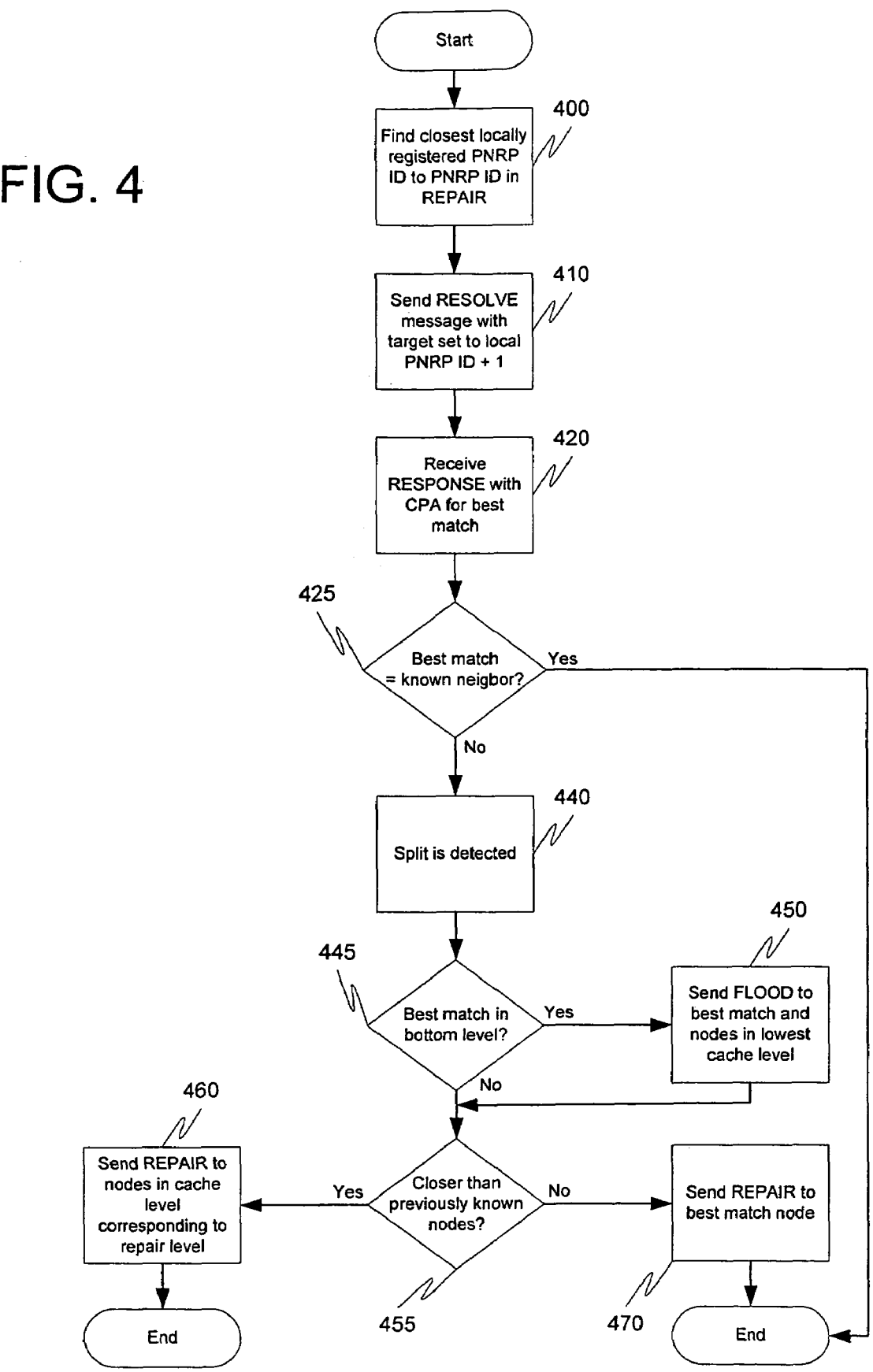
FIG. 4 is a flowchart illustrating an exemplary cloud-split detection and repair method.

When a REPAIR is processed at a node P, as illustrated in FIG. 4, P initially finds the locally registered PNRP ID closest to the PNRP ID 710 specified in the REPAIR message, indicated as step 400. At step 410, P sends a RESOLVE message, with the TargetID set to the this locally registered PNRP ID+1, to the address specified in the REPAIR message. The RESOLVE message may further include a reason code, which would be set to "repairing" to indicate repair-resolve—i.e., a RESOLVE associated with a REPAIR. The RESOLVE message is received at the node having the specified IP address, which processes the RESOLVE message as previously described, and thus forwards the RESOLVE to the BestMatch for the TargetID. At step 420, P receives a RESPONSE message to the RESOLVE that includes the BestMatch. At step 425, P determines whether the BestMatch is one of its known neighbors by determining whether there is a PNRP ID for BestMatch recorded in P's lowest cache level. If so, there is no split and processing stops. Otherwise, P detects a split at step 440.

At step 445, P determines whether the new node discovered in step 420 falls in the bottom cache level (highest number). If so, P performs flooding at step 450 by sending a FLOOD message containing its CPA to the newly found node, and sends the CPA of the newly found node to the other nodes in P's bottom cache level. Each node in the bottom cache level receiving this FLOOD message also sends its own FLOOD message to the newly found node containing its own CPA. P then receives a FLOOD message from each node to which the newly found node flooded P's CPA. All this flooding results in an exchange of several PNRP IDs between the two partitions. P keeps a list of all new nodes it discovers via these FLOOD messages. If the node discovered in step 420 does not fall in the bottom cache level, P proceeds to step 455.

At step 455 P determines whether the new node discovered in step 420 is closer to a locally registered PNRP ID than previously known nodes. If so, then the new node is presumed to be located in the smaller cloud partition, and P proceeds to step 460. Otherwise, the new node is presumed to be in the larger partition, and P proceeds to step 470. At step 460, P sends a new REPAIR message to every node specified by an entry in the cache at the cache level L equal to the repair level R specified in the received REPAIR message. For each new REPAIR message, the PNRP ID of the new REPAIR message includes the PNRP ID and network address of a node in the larger partition, such as a node discovered by step 450, and the repair level R is set to L+1.

If the new node discovered in step 420 is further from the locally registered PNRP ID than previously known nodes, then at step 470 P sends a new REPAIR message to the BestMatch node returned in the RESPONSE to the RESOLVE. The PNRP ID of the new REPAIR message is set to the BestMatch node's PNRP ID, the IP address of the new REPAIR message is set to an address for a randomly selected CPA in the local cache, and the repair level is set to the current repair level, as indicated in the received REPAIR message. Each node that receives a REPAIR message processes processes using the procedure of FIG. 4. Note that when a node creates a RESOLVE, it considers itself as the originator of that RESOLVE.

Notably, the RESOLVE processing described above is not performed by the seed server. When the split test is first initiated, and the REPAIR initiator processes the REPAIR message, the REPAIR initiator sends a RESOLVE message to the seed server. The seed server does not process the RESOLVE, but instead finds a random node in its cache and redirects the RESOLVE to that node. The selected node then processes the RESOLVE as previously discussed. By not performing RESOLVE processing, load on the seed server is alleviated. In another embodiment, the seed server returns a message to the REPAIR initiator indicating the PNRP and IP address of the selected node from the seed server's cache. The REPAIR initiator then replaces the seed server's IP address in the RESOLVE message with the IP address of the selected node.

Figure 5:
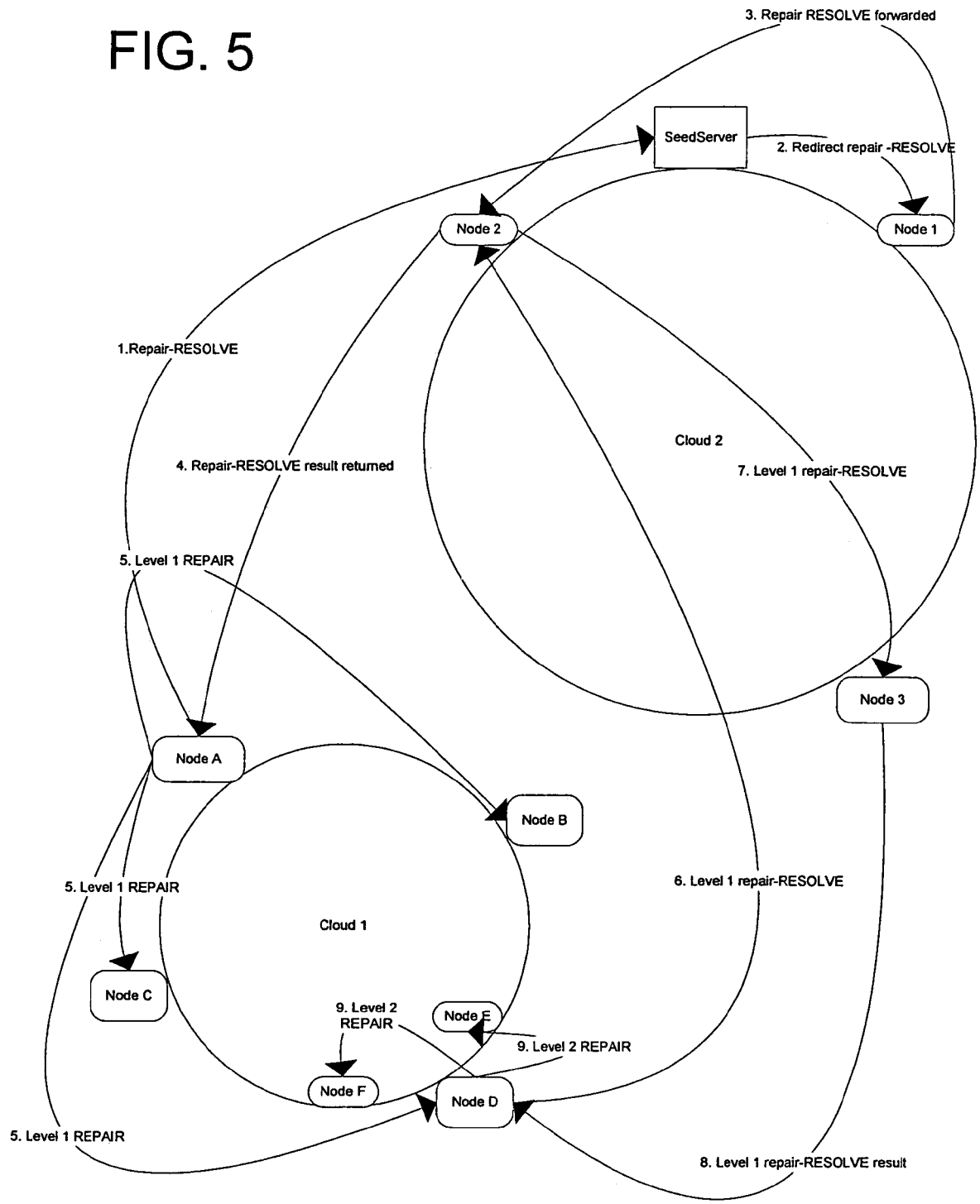
FIG. 5 is a dataflow diagram of communication among nodes trying to repair a split cloud.

For an example of the cloud-split detection and repair procedure, consider FIG. 5. (1) Node A initiates repair-RESOLVE to a seed server. (2) The seed server redirects the repair-resolve message to Node 1. (3) Node 1, finding Node 2 to be the better match, forwards the repair-resolve to Node 2. (4) Node 2 being closest match sends a RESPONSE back to Node A. Node A then determines that Node 2 is not in its cache but should be. (5) Node A sends a REPAIR messages to other nodes in its cache, i.e. Nodes B, C, and D. (6) Node D, for example, then sends a repair-resolve message to Node 2. (7) Node 2 forwards the repair-resolve message to Node 3, which is the best match. (8) Node 3 then sends a RESPONSE back to originator node D. (9) Node D determines that Node 3 is not in its cache and sends repairs to nodes in its next higher cache level, i.e. Nodes E and F. The process continues until cloud is not split.

Figure 6:
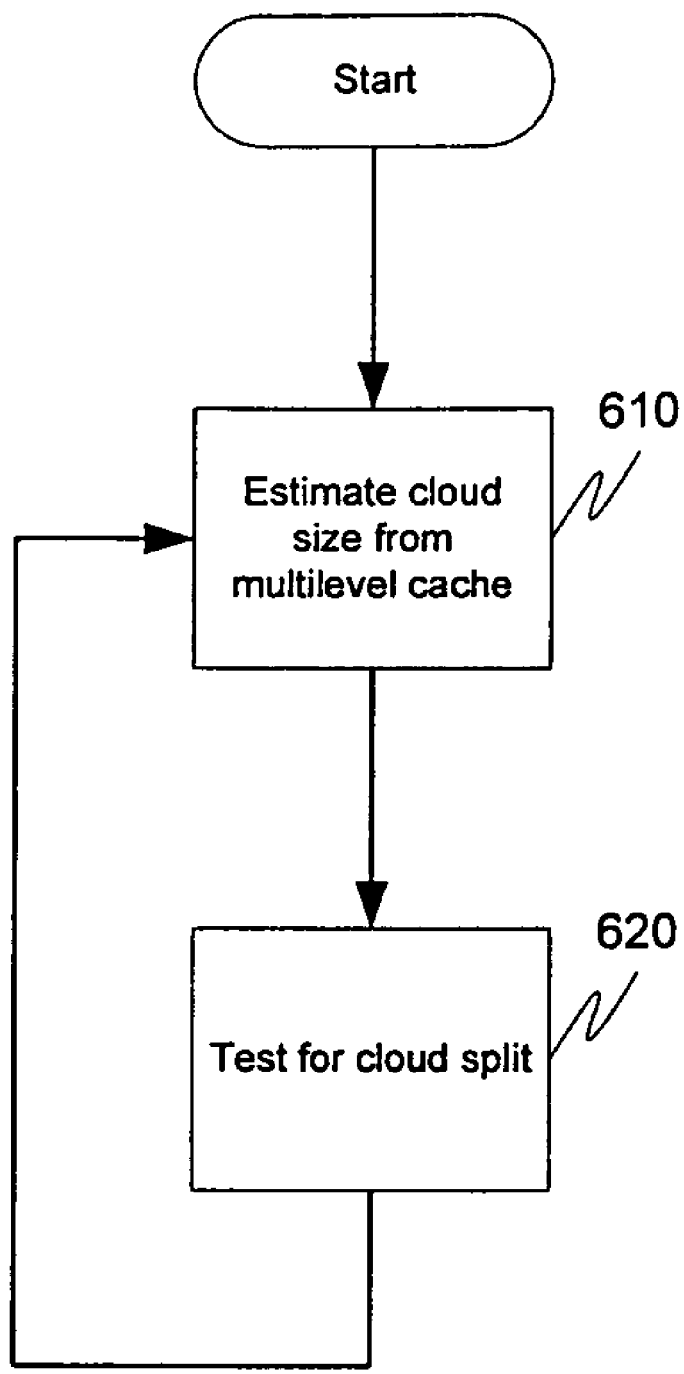
FIG. 6 is a flowchart illustrating an exemplary method of calculating an interval at which to perform cloud-split detection.

Cloud-split detection is attempted periodically, where the period between detection attempts is inversely proportional to the estimated cloud size. Turning to FIG. 6, cloud size is estimated at step 610 by determining the average number of cache levels in each local PNRP cache. Let K be the ratio of the number space covered by each cache level. For example, suppose K is 5. Then the top level covers the entire number space, the next level covers $\frac{1}{5}$ of the number space, the next $\frac{1}{25}$th, and so on. Suppose a local cache has L levels. Then the estimated cloud size is $K^L$. If K is 5 and L is 4, the estimated cloud size is 5 to the power of 4 ($5^4$) or 625 nodes. Therefore the probability that a node will do split detection test at each time period is $\frac{1}{625}$. At step 620, split detection tests are then performed at a frequency inversely proportional to the estimated cloud size. Note that the frequency of split detection may be different then the frequency of overall cache maintenance, so the calculation needs to be adjusted accordingly. If cache maintenance is performed every 10 minutes, but a node should do split detection every minute, then the probability of a single node with 4 levels of cache doing split detection will be 4*(10/625).

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for detecting and repairing a cloud partition in a network, wherein a cloud includes a plurality of nodes, each node having a peer identifier (ID) and a cache of peer IDs for one or more known nodes, the method comprising:

requesting identification information for an adjacent node from a server node;

receiving identification information for a closest-match node that is a closest found match for the adjacent node, and if a peer ID for the closest-match node is not in the cache, determining that the cloud is partitioned, and sending a repair message to a known node indicating the identification information for the closest-match node, and wherein the cache is a multilevel cache, and wherein a host node records an entry for a known node in a level of the multilevel cache in accordance with a distance between a peer ID of the known node and a peer ID of the host node, and wherein entries for known nodes closest to the host node are recorded in a lowest level of the cache, than flooding the identification information of the host node to the closest-match node and of the closest-match node to nodes having entries in the lowest cache level; and further determining that the closest-match node is in a larger partition when the closest-match node is closer than every node in the cache, and sending each node in a top level of the cache a repair message including a peer ID and an address for a node in the larger partition, and a repair level indicating repair is required for a cache level immediately below the top level.

2. The method of claim 1 wherein the peer ID is numeric, and wherein a first node having a first peer ID is adjacent to a second node having a second peer ID if there are no nodes using a peer ID that is between the first peer ID and the second peer ID.

3. The method of claim 1 further comprising receiving a flood message from a node in a different partition of the cloud.

4. The method of claim 1 further comprising determining that the closest-match node is in a smaller partition when the closest-match node is not closer than every node in the cache, and sending a repair message to the closest-match node including identification information for a known node.

5. A computer-readable medium having computer-executable instructions for performing the steps of claim 1.

6. A method for detecting and repairing a cloud partition in a network, wherein a cloud includes a plurality of nodes, each node having a peer identifier (ID) and a cache of peer IDs for one or more known nodes, the method comprising:

receiving a repair message at a host node including identification information for a first node;

requesting from the first node identification information for a second node that is adjacent to the host node;

receiving identification information for a closest-match node that is a closest found match for the second node and if a peer ID for the closest-match node is not in the cache, determining that the cloud is partitioned, and sending a repair message to a known node indicating the identification information for the closest-match node, and wherein the cache is a multilevel cache, and wherein a host node records an entry for a known node in a level of the multilevel cache in accordance with a distance between a peer ID of the known node and a peer ID of the host node, and wherein entries for known nodes closest to the host node are recorded in a lowest level of the cache, than flooding the identification information of the host node to the closest-match node and of the closest-match node to nodes having entries in the lowest cache level; and further wherein the repair message includes a repair level L, determining that the closest-match node is in a larger partition when the closest-match node is closer than every node in the cache, and sending each node in a level of the cache equal to L a repair message including a peer ID and an address for a node in the larger partition, and a repair level equal to L+1.

7. The method of claim 6 wherein the peer ID is numeric, and wherein the second node having a second peer ID is adjacent to the host node having a host peer ID if there are no other nodes using a peer ID that is between the second peer ID and the host peer ID.

8. The method of claim 6 further comprising receiving a flood message from a node in a different partition of the cloud.

9. The method of claim 6 further comprising determining that the closest-match node is in a smaller partition when the closest-match node is not closer than every node in the cache, and sending a repair message to the closest-match node including identification information for a known node.

10. A computer-readable medium having computer-executable instructions for performing the steps of claim 6.

* * * * *